US011392642B2

(12) United States Patent
Zhou et al.

(10) Patent No.: US 11,392,642 B2
(45) Date of Patent: Jul. 19, 2022

(54) IMAGE PROCESSING METHOD, STORAGE MEDIUM, AND COMPUTER DEVICE

(71) Applicant: TENCENT TECHNOLOGY (SHENZHEN) COMPANY LIMITED, Shenzhen (CN)

(72) Inventors: Jingjin Zhou, Shenzhen (CN); Pei Cheng, Shenzhen (CN); Bin Fu, Shenzhen (CN); Yu Gao, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 78 days.

(21) Appl. No.: 16/999,047

(22) Filed: Aug. 20, 2020

(65) Prior Publication Data
US 2020/0380031 A1 Dec. 3, 2020

Related U.S. Application Data

(63) Continuation of application No. PCT/CN2019/091359, filed on Jun. 14, 2019.

(30) Foreign Application Priority Data

Jul. 4, 2018 (CN) .......................... 201810723144.8

(51) Int. Cl.
*G06F 16/783* (2019.01)
*G06K 9/62* (2022.01)
(Continued)

(52) U.S. Cl.
CPC ...... *G06F 16/7834* (2019.01); *G06F 16/7837* (2019.01); *G06K 9/6288* (2013.01); *G06T 19/006* (2013.01); *G06V 20/20* (2022.01)

(58) Field of Classification Search
CPC ............ G06F 16/7834; G06F 16/7837; G06K 9/6288; G06K 9/6272; G06T 19/006;
(Continued)

(56) References Cited

U.S. PATENT DOCUMENTS 9,361,447 B1 * 6/2016 Bowers .................. G06F 21/36
10,277,834 B2 * 4/2019 Greenberger ........... G10L 21/10
(Continued)

FOREIGN PATENT DOCUMENTS

| CN | 104036789 A | 9/2014 |
|----|-------------|--------|
| CN | 107329980 A | 11/2017 |

(Continued)

OTHER PUBLICATIONS

Taiwan Intellectual Property Office Examination report for Application No. 108123650 dated May 27, 2022 12 pages.

*Primary Examiner* — Motilewa Good-Johnson
(74) *Attorney, Agent, or Firm* — Anova Law Group, PLLC

(57) ABSTRACT

An image processing method includes: obtaining audio data corresponding to a reality scene image acquired in real time; dynamically determining attribute information of a virtual object according to the audio data, the attribute information indicating a visual state of the virtual object; identifying a target object from the reality scene image; determining, according to the target object, a fusion location of the virtual object determined according to the attribute information in the reality scene image according to the target object; fusing the virtual object determined according to the attribute information into the reality scene image according to the fusion location, the virtual object presenting different visual states that correspond to different attribute information dynamically determined according to the audio data.

20 Claims, 11 Drawing Sheets

(a)

(b)

(51) Int. Cl.
*G06T 19/00* (2011.01)
*G06V 20/20* (2022.01)

(58) Field of Classification Search
CPC .......... G06T 3/00; G06V 20/20; G06V 10/44; G06V 40/171; G06V 40/172; H04N 5/23229
See application file for complete search history.

(56) References Cited

U.S. PATENT DOCUMENTS

| | | | |
|---|---|---|---|
| 10,445,936 B1* | 10/2019 | Charlton | G06T 19/20 |
| 11,089,427 B1* | 8/2021 | Canberk | H04S 7/303 |
| 2003/0210832 A1* | 11/2003 | Benton | G06T 15/20 |
| | | | 382/284 |
| 2011/0191674 A1* | 8/2011 | Rawley | G06F 3/016 |
| | | | 715/702 |
| 2013/0182858 A1* | 7/2013 | You | G06F 3/167 |
| | | | 381/58 |
| 2014/0064517 A1 | 3/2014 | Ko | |
| 2016/0330512 A1* | 11/2016 | Du | H04N 7/04 |
| 2017/0109916 A1* | 4/2017 | Kurz | G06F 3/16 |
| 2019/0199939 A1* | 6/2019 | Greenberger | H04N 5/2621 |
| 2020/0312029 A1* | 10/2020 | Heinen | G06T 7/593 |
| 2021/0012113 A1* | 1/2021 | Petill | G06F 3/04842 |
| 2021/0407160 A1* | 12/2021 | Kurz | G06T 19/006 |
| 2022/0007078 A1* | 1/2022 | Mate | H04N 21/4882 |

FOREIGN PATENT DOCUMENTS

| | | |
|---|---|---|
| CN | 107343211 A | 11/2017 |
| CN | 108769535 A | 11/2018 |
| TW | I423113 B | 1/2014 |
| TW | I579731 B | 4/2017 |

* cited by examiner

FIG. 12

IMAGE PROCESSING METHOD, STORAGE MEDIUM, AND COMPUTER DEVICE

CROSS-REFERENCES TO RELATED APPLICATIONS

This application is a continuation application of PCT Patent Application No. PCT/CN2019/091359, filed on Jun. 14, 2019, which claims priority to Chinese Patent Application No. 201810723144.8, entitled "IMAGE PROCESSING METHOD AND APPARATUS, STORAGE MEDIUM, AND COMPUTER DEVICE" and filed on Jul. 4, 2018, the entire contents of both of which are incorporated herein by reference.

FIELD OF THE TECHNOLOGY

The present disclosure relates to the field of image processing technologies, and in particular, to an image processing method and apparatus, a storage medium, and a computer device.

BACKGROUND OF THE DISCLOSURE

With the rapid development of image processing technologies and computer technologies, various clients configured to record videos emerge. For example, a user may record a video combining virtual objects and reality by using a client.

Currently, when recording a video, a user may select virtual objects from a recording interface of a client, and add the virtual objects to corresponding locations of image frames corresponding to the video, so that the virtual objects may move as moving targets in the image frames move.

However, in the video recorded in the foregoing manner, the virtual objects can only move as the moving targets move, which has poor interactivity.

SUMMARY

Based on this, an image processing method and apparatus, a storage medium, and a computer device are provided, to resolve the technical problem of poor interactivity caused because virtual objects can only move as moving targets move.

An image processing method is applied to an image processing system. The method includes: obtaining audio data corresponding to a reality scene image acquired in real time; dynamically determining attribute information of a virtual object according to the audio data, the attribute information indicating a visual state of the virtual object; identifying a target object from the reality scene image; determining, according to the target object, a fusion location of the virtual object determined according to the attribute information in the reality scene image according to the target object; fusing the virtual object determined according to the attribute information into the reality scene image according to the fusion location, the virtual object presenting different visual states that correspond to different attribute information dynamically determined according to the audio data.

A non-transitory storage medium stores a computer program, the computer program, when executed by a processor, causing the processor to perform: obtaining audio data corresponding to a reality scene image acquired in real time; dynamically determining attribute information of a virtual object according to the audio data, the attribute information indicating a visual state of the virtual object; identifying a target object from the reality scene image; determining, according to the target object, a fusion location of the virtual object determined according to the attribute information in the reality scene image according to the target object; fusing the virtual object determined according to the attribute information into the reality scene image according to the fusion location, the virtual object presenting different visual states that correspond to different attribute information dynamically determined according to the audio data.

A computer device includes a memory and a processor coupled to the memory. The processor is configured to perform: obtaining audio data corresponding to a reality scene image acquired in real time; dynamically determining attribute information of a virtual object according to the audio data, the attribute information indicating a visual state of the virtual object; identifying a target object from the reality scene image; determining, according to the target object, a fusion location of the virtual object determined according to the attribute information in the reality scene image according to the target object; fusing the virtual object determined according to the attribute information into the reality scene image according to the fusion location, the virtual object presenting different visual states that correspond to different attribute information dynamically determined according to the audio data.

Other aspects of the present disclosure can be understood by those skilled in the art in light of the description, the claims, and the drawings of the present disclosure.

BRIEF DESCRIPTION OF THE DRAWINGS

Figure 12:
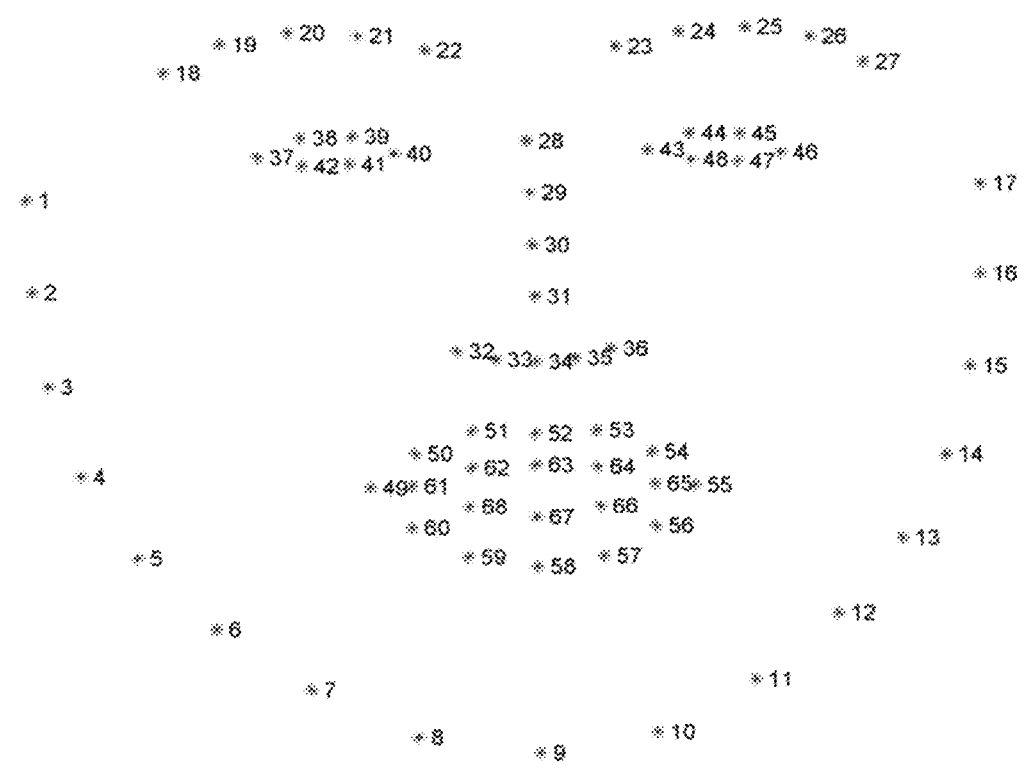

FIG. 12 is a schematic diagram of facial feature points of a target object according to an embodiment.

DESCRIPTION OF EMBODIMENTS

To make objectives, technical solutions, and advantages of the present disclosure clearer and more comprehensible, the following further describes the present disclosure in detail with reference to the accompanying drawings and embodiments. It is to be understood that the specific embodiments described herein are only used to describe the present disclosure, instead of limiting the present disclosure.

Figure 1:
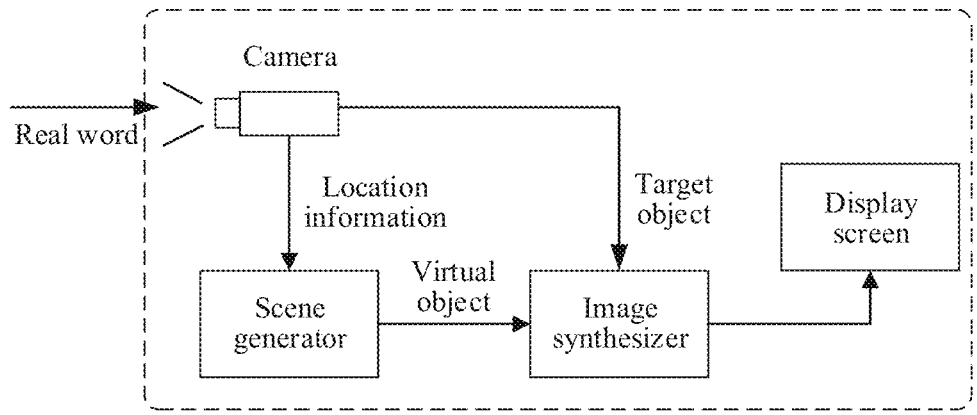
FIG. 1 is a structural diagram of a system to which an image processing method is applied according to an embodiment.

FIG. 1 is a diagram of an application environment of an image processing method according to an embodiment. Referring to FIG. 1, the image processing method is applied to an image processing system. The image processing system may be one terminal or a combination of a plurality of terminals. The terminal may be a smartphone, a computer, or other devices capable of supporting an augmented reality (AR) technology. As shown in FIG. 1, the image processing system may include: a camera, a scene generator, an image synthesizer, and a display.

The camera is configured to obtain a reality scene image of an environment corresponding to a target object, and send the obtained reality scene image to the image synthesizer, to perform a synthesis operation with a virtual object of an AR model.

The scene generator is configured to determine a fusion location of the virtual object according to location information of the target object in the reality scene image, for example, determine the fusion location of the virtual object by analyzing features of the target object, and then send the virtual object to the image synthesizer.

The image synthesizer is configured to fuse, according to the fusion location, the reality scene image about the target object and the virtual object, and output a fusion result to the display.

The display is configured to display a fused image outputted by the image synthesizer, thereby displaying the target object and the virtual object used in the AR model together.

Figure 2:
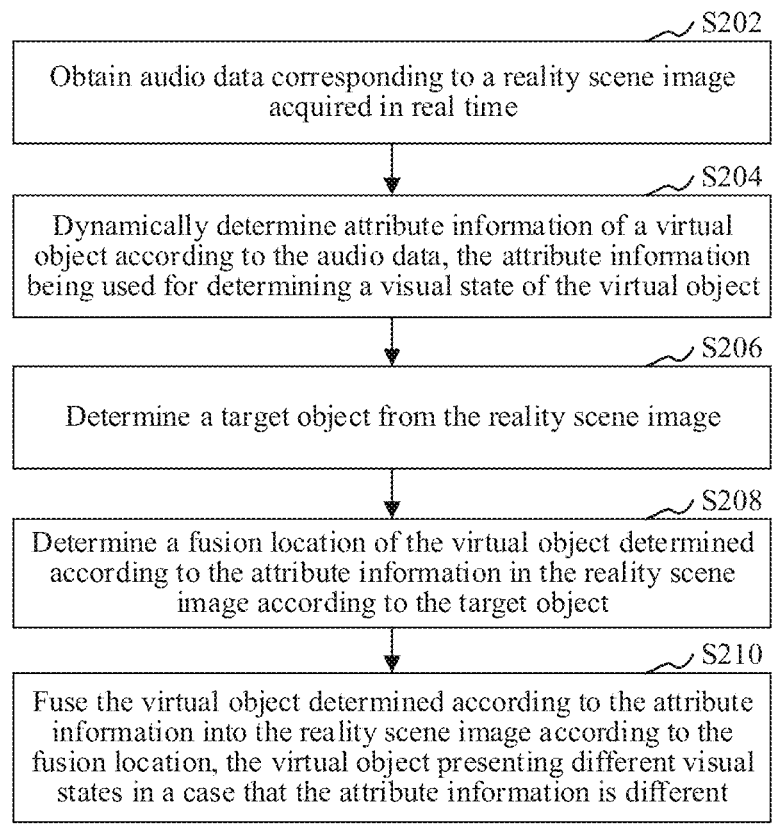
FIG. 2 is a schematic flowchart of an image processing method according to an embodiment.

As shown in FIG. 2, in an embodiment, an image processing method is provided. This embodiment is described by using an example in which the method is applied to the terminal in FIG. 1. Referring to FIG. 2, the image processing method specifically includes the following steps:

S202. Obtain audio data corresponding to a reality scene image acquired in real time.

A reality scene may refer to a reality image viewed by a user through a medium. The reality image includes at least one of the following: a character, a natural scenery, a cultural scenery, and an intelligent work of human. The intelligent work of human refers to a work created by human through efforts and intelligence.

For example, the reality scene is an image of human and nature viewed by a user through eyes, or an image of a stereoscopic movie viewed by a user through a pair of 3D glasses. The reality scene image may be an image that is about the reality scene and that is acquired by using the terminal. For example, the reality scene image is an image of the reality scene acquired in real time by using the camera in FIG. 1. After acquiring a plurality of reality scene images, the terminal may combine the plurality of reality scene images according to an acquisition time, to obtain a video.

The audio data is an audio signal in time domain, and the audio data carries frequencies, amplitude change information, and the like of regular sound waves of speech, music, and an audio effect. The audio data may be classified into a regular audio and an irregular audio according to a feature of a sound wave. The regular audio may be further classified into speech, music, and an audio effect. The audio data may be acquired by the terminal from the outside, or may be read from a background audio of the reality scene image. The background audio may be a piece of music being played by the image processing device.

In an embodiment, S202 may specifically include: the terminal acquires the audio data corresponding to the reality scene image from a current environment in real time in a case of acquiring the reality scene image in real time; or the terminal reads audio data corresponding to a timestamp corresponding to the reality scene image from a background audio of the reality scene image acquired in real time.

For example, the terminal acquires music or a voice in the current environment by using a microphone when acquiring the reality scene image in real time. Alternatively, because in a development process, a developer sets that background music is automatically played when the reality scene image is acquired in real time, a timestamp corresponding to the reality scene image is generated when the terminal acquires the reality scene image in real time, and audio data corresponding to the timestamp corresponding to the reality scene image is read from the automatically played background music. Alternatively, if a music client simultaneously plays music when the reality scene image is acquired in real time, a timestamp corresponding to the reality scene image is generated when the terminal acquires the reality scene image in real time, and audio data corresponding to the timestamp corresponding to the reality scene image is read from the played music.

S204. Dynamically determine attribute information of a virtual object according to the audio data, the attribute information being used for determining a visual state of the virtual object.

The virtual object may include an image material, for example, a static sticker or a dynamic sticker. In addition, the virtual object may further include virtual props used for augmenting a display effect of a target object. For example, the virtual props may be various virtual hangers and virtual backgrounds used for decorating the target object.

The virtual object may include one or more attributes. Each attribute has one piece of attribute information, and the attribute information is used for determining a visual state of the virtual object.

The attribute information of the virtual object may include at least one of the following: an attribute adjustment amount and a target attribute change value. The attribute adjustment amount includes a zooming ratio, a rotation angle, and an offset of the virtual object. The target attribute change value includes a color RGB value of the virtual object. The attribute adjustment amount is used for representing an adjustment amplitude of an attribute of the virtual object. A corresponding attribute of the virtual object can be adjusted according to the attribute adjustment amount, to determine an adjusted attribute. The target attribute change value is used for representing a target attribute value of an attribute of the virtual object. A corresponding attribute of the virtual object can be adjusted according to the target attribute change value, so that the adjusted attribute is the target attribute change value.

Attribute information of the determined virtual object is current attribute information of the reality scene image acquired in real time. For different reality scene images, attribute information of determined virtual objects may be different. For example, assuming that a user shoots a video having an AR effect, if an $i^{th}$ frame of reality scene image in the video is a current reality scene image, attribute information of a virtual object at a moment corresponding to the $i^{th}$ frame of reality scene image is current attribute information. If an $(i-1)^{th}$ frame of reality scene image in the video is a reality scene image at a previous moment, attribute information of a virtual object at a moment corresponding to the $(i-1)^{th}$ frame of reality scene image is attribute information at the previous moment. i is a positive integer greater than or equal to 1.

In an embodiment, the terminal dynamically determines attribute information of a virtual object according to the audio data, and adjusts the virtual object according to the determined attribute information, to obtain a virtual object determined according to the attribute information.

In an embodiment, the audio data has parameter values such as a volume value, a frequency value, and a timbre. The terminal dynamically determines attribute information of a virtual object according to the audio data. When the terminal updates original attribute information of the virtual object to the determined attribute information, adjustment of the virtual object may be implemented. For example, the terminal adjusts a zooming ratio of the virtual object or adjusts a color RGB value of the virtual object according to a frequency value of the audio data.

S206. Determine/Identify a target object from the reality scene image.

The target object may be a living object in nature, such as human, an animal, or a plant.

In an embodiment, S206 may specifically include: recognizing a biological feature from the reality scene image; and in a case that the biological feature meets a preset condition, determining a biological object corresponding to the biological feature, in the reality scene image as the target object.

The biological feature may be a biological contour feature, or may be a biological detail feature, such as a facial feature of human.

In an embodiment, the preset condition may include a preset biological feature or a preset integrity threshold of the biological feature. The terminal recognizes a biological feature from the reality scene image. When the biological feature meets the preset biological feature, and/or an integrity of the biological feature reaches the preset integrity threshold, an object corresponding to the biological feature in the reality scene image is determined as the target object.

That is, when the biological feature meets the preset biological feature, an object corresponding to the biological feature in the reality scene image is determined as the target object. Alternatively, when an integrity of the biological feature reaches the preset integrity threshold, an object corresponding to the biological feature in the reality scene image is determined as the target object. Alternatively, when the biological feature meets the preset biological feature, and an integrity of the biological feature reaches the preset integrity threshold, an object corresponding to the biological feature in the reality scene image is determined as the target object.

S208. Determine a fusion location of the virtual object determined according to the attribute information in the reality scene image according to the target object.

The fusion location may refer to a location of a central point or a key location point of the virtual object in the reality scene image when the virtual object is fused into the reality scene image. The fusion location may be one location point, or may be a plurality of location points. For different virtual objects or different parts of the same virtual object, different fusion locations may be determined. For example, different virtual objects may be fused into different parts of the target object, and different parts of the same virtual object may be fused into different parts of the target object.

In an embodiment, the terminal detects features of the target object, selects a feature matching the virtual object from the features of the target object, and determines the fusion location of the virtual object determined according to the attribute information in the reality scene image according to the selected feature.

The feature matching the virtual object may be determined according to a type of the virtual object. Different types of virtual objects may match the same feature or different features. In an example, different types of virtual objects may be set, and a matched feature is set for each type of virtual object, thereby establishing a matching relationship between the virtual object and the feature. Therefore, subsequently, the feature matching the virtual object may be determined according to the matching relationship. For example, a feature matching a pair of AR diving goggles is an eye feature, and a feature matching a virtual prop of an AR rabbit decoration is a mouth feature.

The determining, according to the selected feature, the fusion location of the virtual object determined according to the attribute information in the reality scene image may include: determining a location of the selected feature as the fusion location of the virtual object in the reality scene image.

Figure 3:
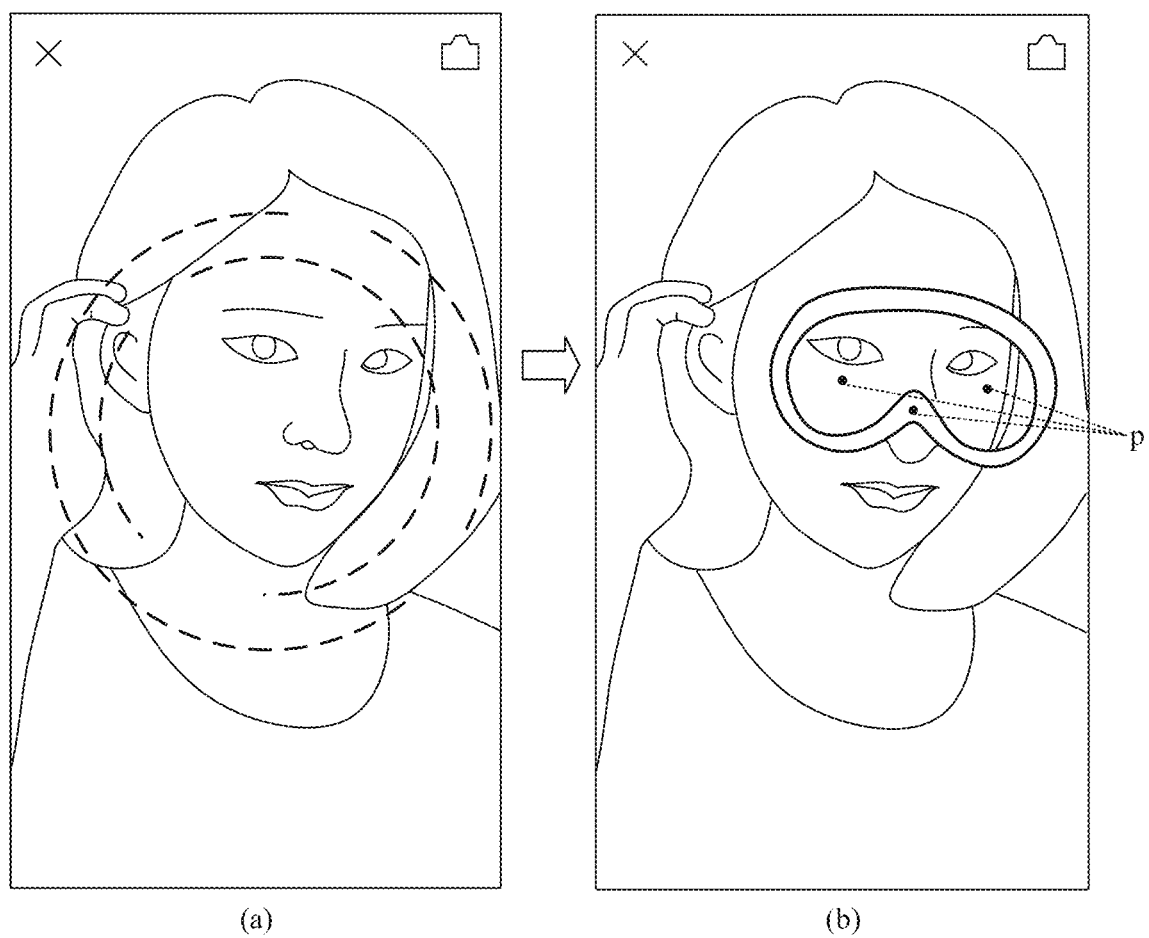
FIG. 3 is a schematic diagram of fusing a virtual object into a reality scene image according to an embodiment.

In an example, as shown in FIG. 3, when the virtual object is a virtual prop of a pair of AR diving goggles, the terminal detects features of the target object, determines an eye feature from the detected features, and determines, according to the eye feature, that the fusion location of the virtual object is an eye location of the user.

Figure 4:
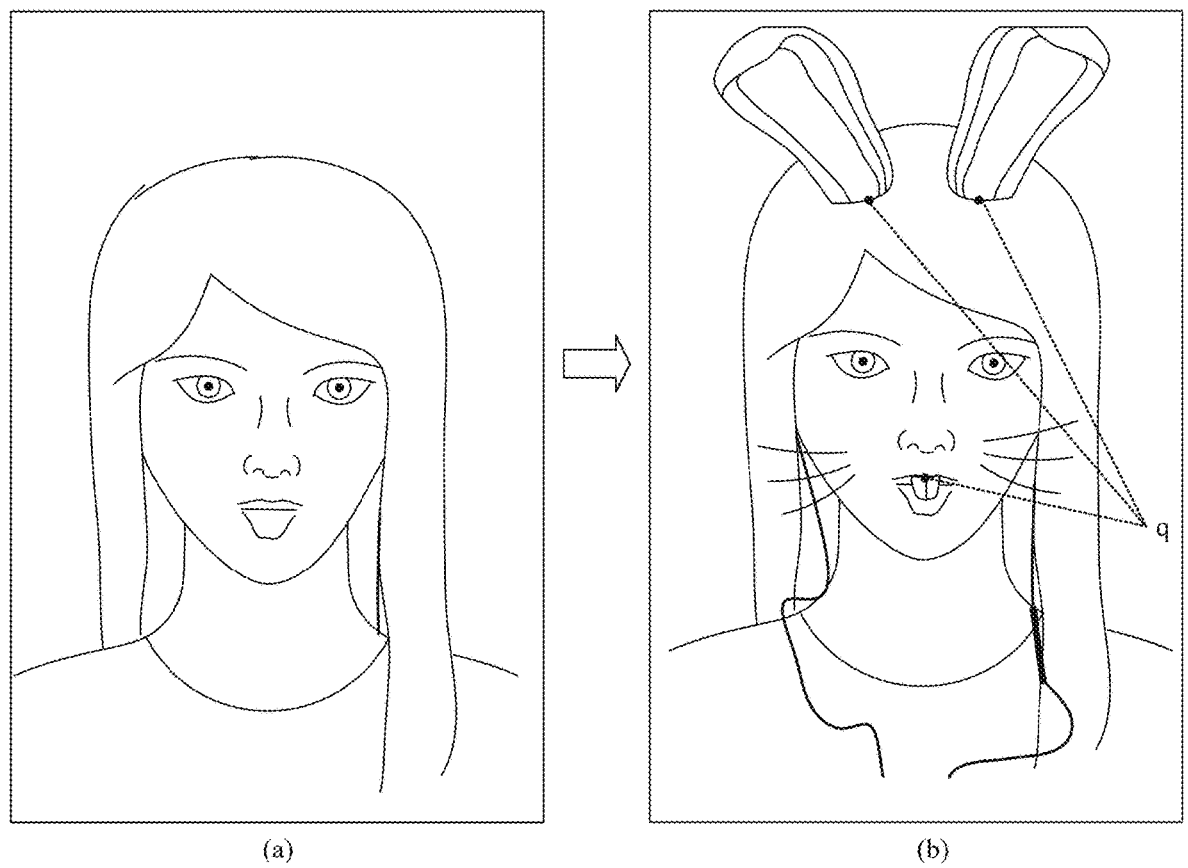
FIG. 4 is a schematic diagram of fusing a virtual object into a reality scene image according to an embodiment.

In another example, as shown in FIG. 4, when the virtual object is a virtual prop of an AR rabbit decoration, for a virtual rabbit teeth prop in the AR rabbit decoration, the terminal detects features of the target object, determines a mouth feature from the detected features, and determines, according to the mouth feature, that the fusion location of the virtual object is a mouth location of the user. For a virtual ear prop in the AR rabbit decoration, the terminal detects features of the target object, determines a head feature (such as hair) from the detected features, and determines, according to the head feature, that the fusion location of the virtual object is a head location of the user.

Alternatively, for the same virtual object, the virtual object may include a plurality of parts, and different parts may match different features. In an example, when the virtual object is a virtual raincoat prop, a feature matching the head in the virtual raincoat prop is a head feature, and a feature matching an arm in the virtual raincoat prop is an arm feature.

In an embodiment, the terminal adjusts the virtual object according to the attribute information, so that the virtual object is zoomed, a color RGB value of the virtual object is changed, or a rotation angle of the virtual object is changed. The terminal adjusts the virtual object according to the attribute information with reference to a virtual object in a previous fused reality scene image, thereby implementing an operation such as zooming the current virtual object, changing the color RGB value, or changing the rotation angle.

S210. Fuse the virtual object determined according to the attribute information into the reality scene image according to the fusion location, the virtual object presenting different visual states that correspond to different attribute information dynamically determined according to the audio data.

In an embodiment, the terminal determines a central point or a key location point of the virtual object, and fuses the central point or the key location point of the virtual object into a region matching the fusion location, thereby fusing the virtual object into the reality scene image. The central point or the key location point is used for determining a region into which the virtual object is to be fused, and is used for matching the corresponding fusion location. That is, during fusing, the central point of the virtual object is placed at the corresponding fusion location, or the key location point of the virtual object is placed at the corresponding fusion location.

As shown in FIG. 3, p represents key location points of the virtual object, and the key location points are three locations of the virtual prop of the AR diving goggles. When the virtual prop of the AR diving goggles is fused into the reality scene image, the virtual prop of the AR diving goggles is aligned with two eyes and the nose of the target object according to the p points in FIG. 3, thereby accurately fusing the virtual prop of the AR diving goggles. A specific effect is shown in FIG. 3(b).

As shown in FIG. 4, q represents key location points of the virtual object, and are respectively located at the upper portion of the virtual rabbit teeth prop of the AR rabbit decoration and the lower portions of two virtual ear props of the AR rabbit decoration. When the virtual prop of the AR rabbit decoration is fused into the reality scene image, the virtual prop of the AR rabbit decoration is fused into the lip part and the head of the target object according to the key location points, thereby accurately fusing the virtual prop of the AR rabbit decoration. A specific effect is shown in FIG. 4(b).

The virtual object presents different visual states in a case that the attribute information is different. For example, assuming that a user shoots a video having an AR effect, if an $i^{th}$ frame of reality scene image in the video is a current reality scene image, attribute information of a virtual object at a moment corresponding to the $i^{th}$ frame of reality scene image is current attribute information. If an $(i-1)^{th}$ frame of reality scene image in the video is a reality scene image at a previous moment, attribute information of a virtual object at a moment corresponding to the $(i-1)^{th}$ frame of reality scene image is attribute information at the previous moment. i is a positive integer greater than or equal to 1. When reality scene images are combined with virtual objects of corresponding attribute information according to a time sequence, a video having an AR effect may be obtained. In the video, the attribute information of the virtual object changes as the audio data changes. If a volume value or a frequency value of the audio data changes, a size, a color RGB value, or an orientation of the virtual object also changes accordingly.

Figure 5:
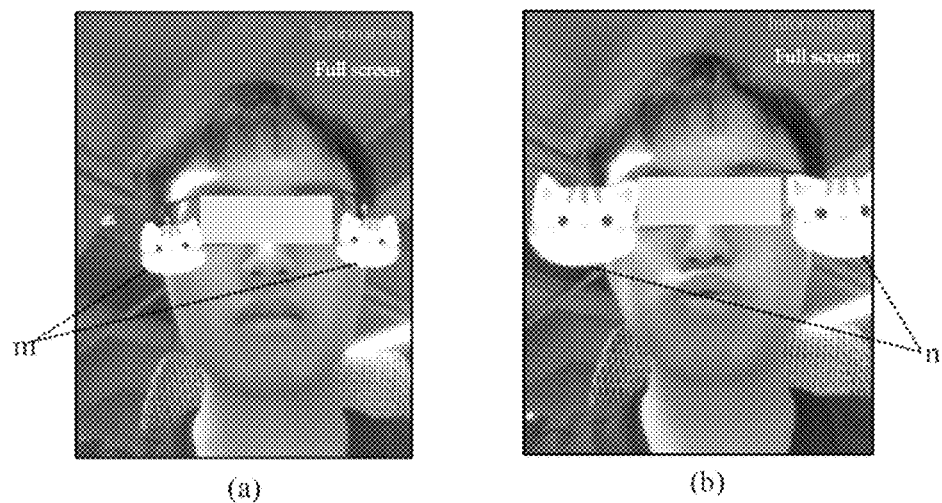
FIG. 5 is a schematic diagram of determining attribute information according to audio data, and fusing a virtual object having the attribute information into a reality scene image according to an embodiment.

In an example, as shown in FIG. 5, it is assumed that FIG. 5(a) shows a reality scene image fused at a previous moment, and m is a virtual object of an original size. When a parameter value of the obtained audio data changes, for example, a volume value changes, or a frequency value changes, a size of a corresponding virtual object also changes, and the changed virtual object is shown as n in FIG. 5(b), n being a zoomed-in virtual object.

In the foregoing embodiment, audio data corresponding to a reality scene image acquired in real time is obtained, and an attribute of a virtual object is dynamically determined by using the audio data, thereby implementing control on the attribute of the virtual object according to the audio data. A fusion location of the virtual object in the reality scene image is determined by using a target object in the reality scene image, and the virtual object determined according to attribute information is fused into the reality scene image according to the fusion location. Because the attribute information of the virtual object is controlled by the audio data, when the audio data changes, the attribute information of the virtual object fused into the reality scene image also changes accordingly, which improves interactivity.

Figure 6:
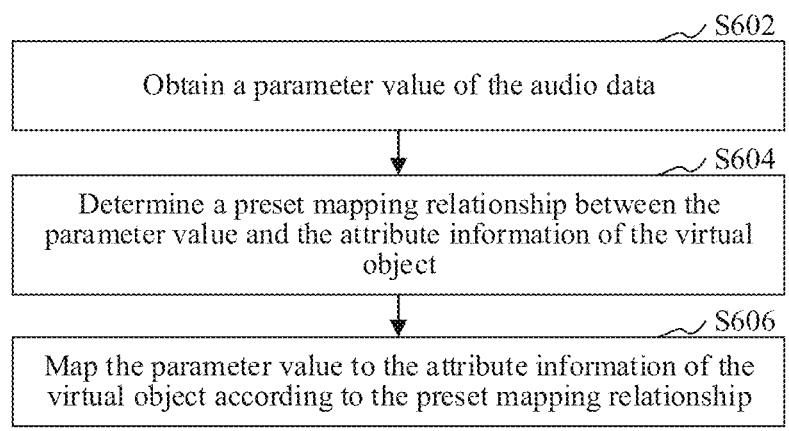
FIG. 6 is a schematic flowchart of steps of determining attribute information of a virtual object according to a parameter value of audio data according to an embodiment.

In an embodiment, as shown in FIG. 6, S204 may specifically include:

S602. Obtain a parameter value of the audio data.

The parameter value of the audio data includes a volume value, a frequency value, and a timbre of the audio data. The volume value may be any one of the following: an average volume value, a maximum volume value, or a minimum volume value. The frequency value may be any one of the following: an average frequency value, a maximum frequency value, or a minimum frequency value.

Specifically, the terminal obtains parameter values such as the volume value, the frequency value, and the timbre of the audio data by analyzing the audio data.

In an embodiment, S602 may specifically include: performing sampling on the audio data; performing quantization and encoding on a result obtained through the sampling, to obtain encoded audio data; and determining the parameter value of the audio data according to the obtained encoded audio data.

Specifically, the terminal performs sampling, quantization, and encoding, in a pulse code modulation (PCM) manner, on temporally consecutive time domain audio data that is acquired, to obtain binary encoded audio data. The terminal determines the parameter value of the audio data according to the obtained encoded audio data, for example, determines a volume value of the audio data.

Figure 7:
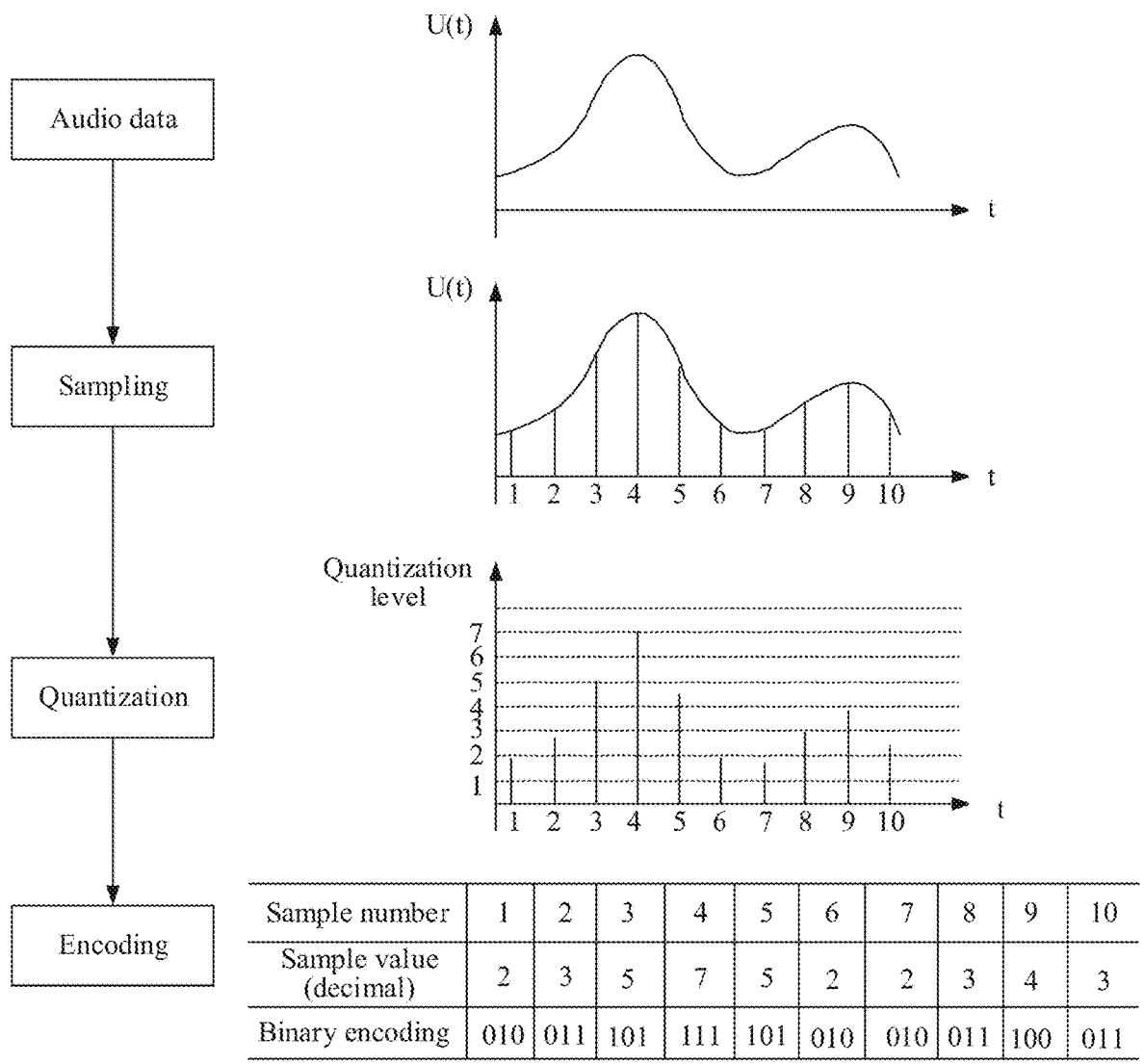
FIG. 7 is a schematic diagram of performing sampling, quantization, and encoding on audio data according to an embodiment.

In an example, as shown in FIG. 7, audio data U(t) is sampled, to discretize the temporally consecutive time domain audio data. The discretized audio data is quantized, to obtain M-nary quantized audio data, M being a positive integer greater than 2. The quantized audio data is encoded, to obtain the binary encoded audio data.

S604. Determine a preset mapping relationship between the parameter value and the attribute information of the virtual object.

In an embodiment, different types of parameter values correspond to different preset mapping relationships. The terminal determines a preset mapping relationship between the parameter value and the attribute information of the virtual object according to a type of the parameter value. The type includes a volume type, a frequency type, and a timbre type. The parameter value corresponding to the type includes a volume value, a frequency value, and a timbre.

For example, if the parameter value is a volume value, and the attribute information is a zooming ratio, the terminal determines a preset mapping relationship between a volume value and a zooming ratio of the virtual object. The preset mapping relationship may be a functional relation, which is shown as follows:

$$f(x) = \begin{cases} 1.0, & x < 50 \\ 1.0 + 3.0 \times \dfrac{x-50}{70}, & x \geq 50 \end{cases}$$

where x is a volume value of the audio data, and may range from 0 to 120 decibels (db), and $f(x)$ is a zooming ratio of the virtual object.

S606. Map the parameter value to the attribute information of the virtual object according to the preset mapping relationship.

In an embodiment, when determining the preset mapping relationship, the terminal inputs the parameter value as a variable into the preset mapping relationship, to obtain corresponding attribute information of the virtual object. For example, when the volume value is 40 db, the volume value of 40 is inputted into the function $f(x)$, to obtain a zooming ratio with attribute information being 1. That is, no zoom-in or zoom-out processing is performed on the original virtual object. In another example, when the volume value is 120 db, the volume value of 120 is inputted into the function $f(x)$, to obtain a zooming ratio with attribute information being 4. That is, the original virtual object is zoomed in to four times of the original virtual object. It can be seen that, the attribute information of the virtual object changes as the parameter value of the audio data changes, thereby implementing control on the virtual object according to the parameter value of the audio data, so that the virtual object presents different visual states.

In the foregoing embodiment, a preset mapping relationship between the parameter value and the attribute information of the virtual object is determined. When a corresponding parameter value is obtained, corresponding attribute information of the virtual object may be obtained by using the preset mapping relationship, thereby implementing adjustment on the virtual object, so that the virtual object presents different visual states, and diversified changes of the virtual object are increased.

Figure 8:
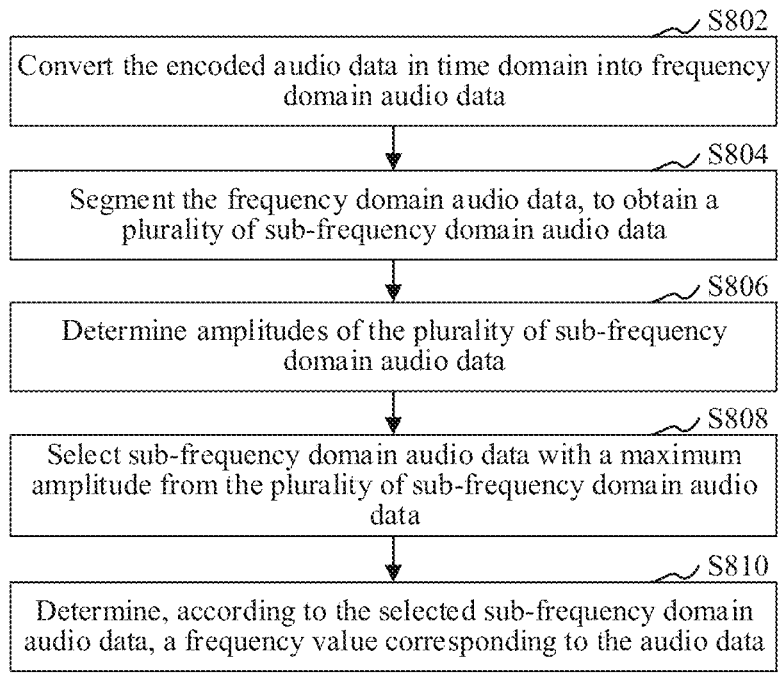
FIG. 8 is a schematic flowchart of steps of determining a frequency value according to encoded audio data according to an embodiment.

In an embodiment, the attribute information of the virtual object may be determined by using a parameter value of the audio data, and the parameter value may be a frequency value or a volume value. When the parameter value is the frequency value, as shown in FIG. 8, the foregoing step of determining the parameter value of the audio data according to the obtained encoded audio data may specifically include:

S802. Convert the encoded audio data in time domain into frequency domain audio data.

In an embodiment, the encoded audio data is a discretized audio signal. The terminal converts the encoded audio data into frequency domain audio data according to discrete Fourier transform. The frequency domain audio data includes an amplitude value (that is, the volume value), a frequency value, and a phase of the audio data.

S804. Segment the frequency domain audio data, to obtain a plurality of sub-frequency domain audio data.

In an embodiment, the terminal segments the frequency domain audio data according to a set step, to obtain a plurality of sub-frequency domain audio data. For example, when 512-point Fourier transform is used, frequency bands from 0 to a cut-off frequency (if a sampling rate is 48 kHz, the cut-off frequency is 24 kHz) may be equally segmented into 256 frequency bands at most, and then S806, that is, determining amplitudes in the frequency bands, is performed.

In an embodiment, the terminal segments the frequency domain audio data into a plurality of unequal frequency bands in an unequal segmentation manner, to obtain a plurality of sub-frequency domain audio data.

S806. Determine amplitudes of the plurality of sub-frequency domain audio data.

In an embodiment, each sub-frequency domain audio data includes an amplitude value, a frequency value, and a phase.

The terminal determines amplitudes of the plurality of sub-frequency domain audio data, thereby obtaining volume values of the plurality of sub-frequency domain audio data.

S808. Select sub-frequency domain audio data with a maximum amplitude from the plurality of sub-frequency domain audio data.

A large amplitude of the audio data indicates relatively high power of the audio data. For the obtained audio data, higher power of the audio data corresponds to more useful signals, and lower power of the audio data corresponds to fewer useful signals. For example, the terminal acquires the audio data by using a microphone. When the acquired audio data has low power, it indicates that the currently acquired audio data may be a noise signal. Therefore, sub-frequency domain audio data with a maximum amplitude may be selected.

Specifically, when the amplitudes of the plurality of sub-frequency domain audio data are determined, the amplitudes of the plurality of sub-frequency domain audio data are compared with each other, to obtain the sub-frequency domain audio data with the maximum amplitude.

In an embodiment, the terminal arranges the plurality of sub-frequency domain audio data according to the amplitudes, and selects sub-frequency domain audio data with a maximum amplitude from the plurality of arranged sub-frequency domain audio data.

S810. Determine, according to the selected sub-frequency domain audio data, a frequency value corresponding to the audio data.

In the foregoing embodiment, the frequency domain audio data is segmented, and the frequency value may be determined by using the sub-frequency domain audio data obtained after the division. On one hand, the virtual object may be adjusted by using the frequency value; on the other hand, for the segmented frequency domain audio data, a calculation amount may be reduced during a calculation process, thereby improving a calculation rate.

In an embodiment, the attribute information of the virtual object may be determined by using a parameter value of the audio data, and the parameter value may be a frequency value or a volume value. When the parameter value is the volume value, the step of determining the parameter value of the audio data according to the obtained encoded audio data may specifically include: determining a volume value according to the obtained encoded audio data; or converting the encoded audio data in time domain into frequency domain audio data; and determining a volume value according to the frequency domain audio data.

An amplitude value of the encoded audio data in time domain may represent a volume value of the audio data. In an embodiment, the terminal determines the amplitude value of the encoded audio data in time domain as the volume value of the audio data.

In an embodiment, the encoded audio data is a discretized audio signal. The terminal converts the encoded audio data into frequency domain audio data according to discrete Fourier transform. The frequency domain audio data includes an amplitude value (that is, the volume value), a frequency value, and a phase of a waveform corresponding to the audio data. The terminal determines the amplitude value in the frequency domain audio data as the volume value of the audio data.

In an embodiment, after converting the encoded audio data into the frequency domain audio data, the terminal segments the frequency domain audio data according to a set step, to obtain a plurality of sub-frequency domain audio data. The terminal determines corresponding amplitude values according to the plurality of sub-frequency domain audio data, and determines a maximum amplitude value as the volume value of the audio data, or determines an average amplitude value as the volume value of the audio data.

In the foregoing embodiment, the volume value is determined in two manners, that is, according to the obtained encoded audio data, or according to the frequency domain audio data converted by the encoded audio data in time domain, to obtain the attribute information used for determining the visual state of the virtual object, and the virtual object may be adjusted by using the volume value.

Figure 9:
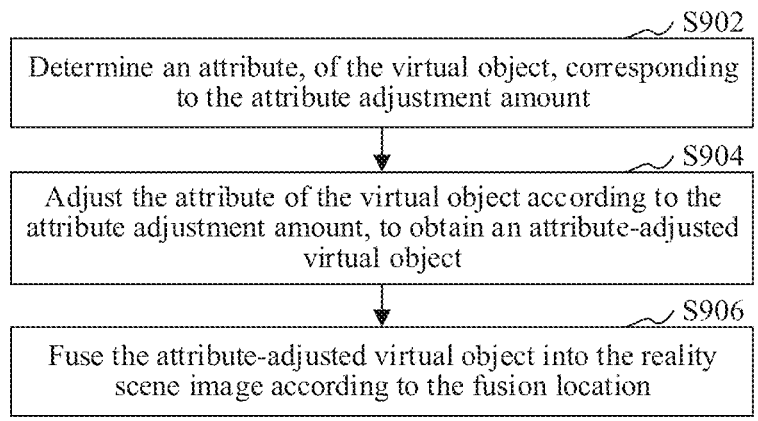
FIG. 9 is a schematic flowchart of steps of adjusting a virtual object according to an attribute adjustment amount, and fusing the adjusted virtual object into a reality scene image according to an embodiment.

In an embodiment, the attribute information of the virtual object may include at least one of the following: an attribute adjustment amount and a target attribute change value. The attribute adjustment amount may include a zooming ratio, a rotation angle, and an offset of the virtual object. The target attribute change value may include a color RGB value of the virtual object. When the attribute information is the attribute adjustment amount, the virtual object determined according to the attribute information is a virtual object having a corresponding attribute that has been adjusted according to the attribute adjustment amount. As shown in FIG. 9, S210 may specifically include:

S902. Determine an attribute, of the virtual object, corresponding to the attribute adjustment amount.

The attribute refers to an attribute of the virtual object, including zooming, a color, rotation, and offset. The attribute corresponding to the attribute adjustment amount includes zooming, rotation, and offset. Correspondingly, the attribute adjustment amount is a specific value corresponding to the attribute.

In an embodiment, the terminal determines an attribute, of the virtual object, corresponding to the attribute adjustment amount according to the parameter value of the audio data.

S904. Adjust the attribute of the virtual object according to the attribute adjustment amount, to obtain an attribute-adjusted virtual object.

In an embodiment, after determining an attribute adjustment amount corresponding to the parameter value of the audio data according to a mapping relationship, the terminal adjusts the virtual object according to the attribute adjustment amount, so that the attribute of the virtual object is changed, to obtain an attribute-adjusted virtual object.

For example, if the attribute adjustment amount is a zooming ratio, a size of the virtual object is adjusted according to the zooming ratio, to obtain a size-adjusted virtual object.

S906. Fuse the attribute-adjusted virtual object into the reality scene image according to the fusion location.

In the foregoing embodiment, the attribute of the virtual object is adjusted by using the attribute adjustment amount, and the attribute-adjusted virtual object is fused into the reality scene image according to the fusion location, to obtain a virtual object which changes as a parameter of the audio data changes, thereby implementing adjustment on the virtual object according to the audio data, so that diversified changes of the virtual object are increased, and user experience is improved.

Figure 10:
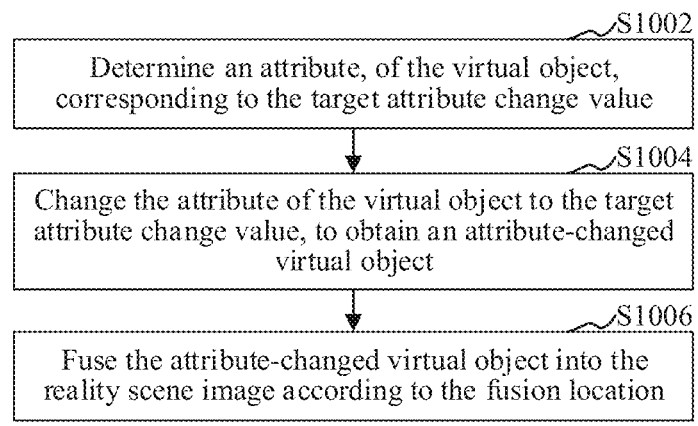
FIG. 10 is a schematic flowchart of steps of adjusting a virtual object according to a target attribute change value, and fusing the adjusted virtual object into a reality scene image according to an embodiment.

In an embodiment, the attribute information of the virtual object may include at least one of the following: an attribute adjustment amount and a target attribute change value. The attribute adjustment amount may include a zooming ratio, a rotation angle, and an offset of the virtual object. The target attribute change value may include a color value (e.g., RGB value) of the virtual object. When the attribute information is the target attribute change value, the virtual object determined according to the attribute information is a virtual object having a corresponding attribute that has been changed to the target attribute change value. As shown in FIG. 10, S210 may specifically include:

S1002. Determine an attribute, of the virtual object, corresponding to the target attribute change value.

The attribute corresponding to the target attribute change value includes the color of the virtual object. Correspondingly, the target attribute change value is a specific value corresponding to the attribute, such as a color RGB value.

In an embodiment, the terminal determines an attribute, of the virtual object, corresponding to the target attribute change value according to the parameter value of the audio data.

S1004. Change the attribute of the virtual object to the target attribute change value, to obtain an attribute-changed virtual object.

In an embodiment, after determining a target attribute change value corresponding to the parameter value of the audio data according to a mapping relationship, the terminal adjusts the virtual object according to the target attribute change value, so that the attribute of the virtual object is changed, to obtain an attribute-adjusted virtual object.

For example, if the target attribute change value is a target color RGB value, a display color of the virtual object is adjusted according to the target color RGB value, so that an original display color of the virtual object is adjusted to a color corresponding to the target color RGB value. If the original display color is red, a blue virtual object is obtained through adjustment by using the target color RGB value.

S1006. Fuse the attribute-changed virtual object into the reality scene image according to the fusion location.

In the foregoing embodiment, the attribute of the virtual object is adjusted by using the target attribute change value, and the attribute-adjusted virtual object is fused into the reality scene image according to the fusion location, to obtain a virtual object which changes as a parameter of the audio data changes, thereby implementing adjustment on the virtual object according to the audio data, so that diversified changes of the virtual object are increased, and user experience is improved.

In an embodiment, when the attribute information is an attribute adjustment amount of a first attribute and a target attribute change value of a second attribute, the virtual object determined according to the attribute information is a virtual object having the first attribute that has been adjusted according to the attribute adjustment amount and having the corresponding second attribute that has been changed to the target attribute change value. S210 may specifically include: determining a first attribute, of the virtual object, corresponding to the attribute adjustment amount, determining a second attribute, of the virtual object, corresponding to the target attribute change value, adjusting the first attribute of the virtual object according to the attribute adjustment amount, changing the second attribute of the virtual object to the target attribute change value, to obtain an attribute-changed virtual object, and fusing the attribute-changed virtual object into the reality scene image according to the fusion location.

Figure 11:
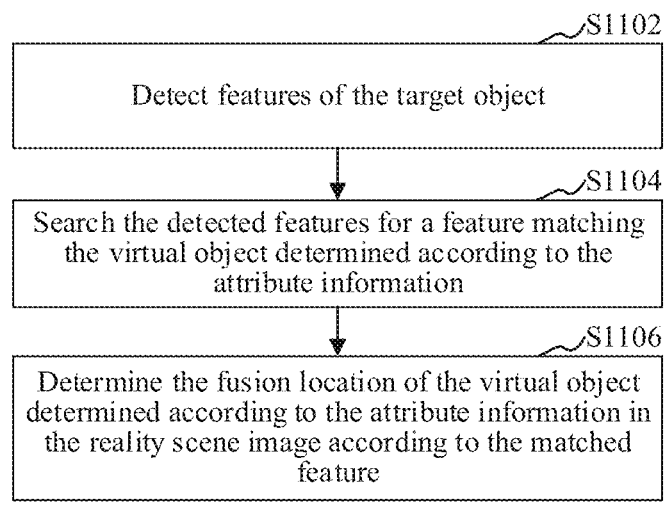
FIG. 11 is a schematic flowchart of steps of determining a fusion location of a virtual object in a reality scene image according to features of a target object according to an embodiment.

In an embodiment, as shown in FIG. 11, S208 may specifically include:

S1102. Detect features of the target object.

Specifically, the terminal detects features of the target object in a feature point detection manner, such as a cascaded regression convolutional neural network (CNN), Dlib, Libfacedetect, or Seetaface.

In an example, FIG. 12 shows a detection result of facial feature points of the target object. For ease of description, the facial feature points obtained through recognition are marked by using numbers. For example, as shown in FIGS. 12, 1 to 17 represent facial edge feature points of the target object, 18 to 22 represent left eyebrow feature points of the target object, 23 to 27 represent right eyebrow feature points of the target object, 28 to 36 represent nose feature points of the target object, 37 to 42 represent left eye feature points of the target object, 43 to 48 represent right eye feature points of the target object, and 49 to 68 represent lip feature points of the target object. The foregoing is merely an example. In an optional embodiment, only some or more feature points in the facial feature points may be recognized, or the feature points are marked in other manners, which all fall within the scope of the embodiments of the present disclosure.

S1104. Search the detected features for a feature matching the virtual object determined according to the attribute information.

Fusion locations corresponding to different virtual objects in the reality scene image are also different. As shown in FIG. 3, a fusion location corresponding to the virtual prop of the AR diving goggles in the reality scene image is to be an eye location of the target object. As shown in FIG. 4, a fusion location corresponding to the virtual prop of the AR rabbit decoration in the reality scene image is to be a head location of the target object. A fusion location corresponding to the rabbit teeth of the virtual prop of the AR rabbit decoration in the reality scene image is to be a tooth part (or a lip part) of the target object. As shown in FIG. 5, fusion locations corresponding to an AR cat decoration in the reality scene image are to be two sides of the face location of the target object.

In an embodiment, the terminal determines a function or usage of the virtual object, determines a part of the target object on which the virtual object is mounted according to the function or usage, and further determines a relationship between the virtual object and the features of the target object. The terminal obtains, from the detected features according to the determined relationship, a feature matching the virtual object determined according to the attribute information.

S1106. Determine the fusion location of the virtual object determined according to the attribute information in the reality scene image according to the matched feature.

In the foregoing embodiment, the fusion location of the virtual object in the reality scene image is determined by using the feature points of the target object, so that the virtual object is fused into the reality scene image according to the fusion location, and a virtual object with the changed visual state is obtained, thereby increasing diversified changes of the virtual object.

In an embodiment, the method further includes: extracting an audio feature of the audio data; and in a case that the audio feature accords with a first trigger condition, performing at least one of the following operations: newly adding a virtual object; switching the virtual object; and switching a type of the visual state.

The audio feature may include at least one of the following: a volume value, a frequency value, a timbre, a log power spectrum, and a Mel frequency cepstrum coefficient of the audio data. The log power spectrum and the Mel frequency cepstrum coefficient may reflect a power value of the audio data and features such as a style feature and speech expressiveness of a speaker. The speech expressiveness may be features such as tone, pitch, and rhythm of the speech. The corresponding first trigger condition may include that the volume value reaches a preset volume threshold, the frequency value reaches a preset frequency threshold, the timbre meets a timbre condition, the power value reaches a power threshold, the style feature of the speaker meets a style feature condition, or the speech expressiveness of the speaker meets an expressiveness condition.

The type of the visual state may be a display size, a display color, and a motion trajectory of the virtual object.

In an embodiment, the terminal performs framing and windowing processing on the audio data in time domain, to obtain each frame of audio data. The terminal performs Fourier transform on each frame of audio data, to obtain a corresponding spectrum. The terminal calculates a power spectrum according to the spectrum of each frame, and then performs a logarithmic operation on the power spectrum, to obtain a log power spectrum. The terminal may determine the log power spectrum as a speech feature, or determine a result obtained by performing discrete cosine transform on the log power spectrum as a speech feature.

For example, assuming that a signal expression of an acquired speech is x(n), and the speech obtained after framing and windowing is x'(n)=x(n)×h(n), discrete Fourier transform is performed on the speech x'(n)=x(n)×h(n) obtained after the windowing, to obtain a corresponding spectrum signal as follows:

$$X(k) = \sum_{n=1}^{N-1} x(n) \times h(n) e^{-j2\pi kn/N}, 1 \leq k \leq N$$

where N represents a quantity of points of the discrete Fourier transform.

When obtaining a spectrum of each frame of speech, the terminal calculates a corresponding power spectrum, and obtains a log power spectrum by solving a logarithm value of the power spectrum, thereby obtaining a corresponding speech feature.

Alternatively, after obtaining the log power spectrum, the terminal inputs the log power spectrum into a triangular filter in a Mel scale, and obtains a Mel frequency cepstrum coefficient by performing discrete cosine transform. The obtained Mel frequency cepstrum coefficient is as follows:

$$C(n) = \sum_{m=1}^{N-1} x(n)\cos\left(\frac{\pi n(m-0.5)}{M}\right), n = 1, 2 \ldots L$$

where the L-order refers to an order of the Mel frequency cepstrum coefficient, which may range from 12 to 16. M refers to a quantity of triangular filters.

In the foregoing embodiment, the audio feature of the audio data is extracted, and when the audio feature meets a corresponding trigger condition, a virtual object may be newly added based on the original virtual object, or the original virtual object is switched to another virtual object, or the original presented visual state is switched, so that the virtual object fused into the reality scene image is diversified, and the presented visual state is diversified, thereby improving interactivity between a user and the virtual object.

In an embodiment, the method may further include: performing recognition according to the audio data, to obtain a recognition result; determining a dynamic effect type matching the recognition result; and determining, according to the dynamic effect type and the attribute information, a visual state presented by the virtual object, the visual state matching the dynamic effect type.

The recognition result may refer to an audio type and a text feature of a keyword in the audio data. The audio type may refer to a music type such as light music, rock music, and Jazz. The text feature may refer to the stressed or unstressed nature of a keyword. The stress may be represented by increasing sound intensity or pitch.

The dynamic effect may be an effect displayed by the virtual object in a dynamic change process. Specifically, the dynamic effect may be any one or a combination of the following: rotating, moving, changing between transparency and non-transparency, and color changing. For example, the virtual object rotates as the audio data changes, or rotates while rotating. Correspondingly, the dynamic effect type may include a rotating type, a moving type, a type of changing between transparency and non-transparency, and a color changing type.

In an embodiment, after recognizing a music type corresponding to the audio data, the terminal obtains a dynamic effect corresponding to the music type, and determines, according to the obtained dynamic effect and the attribute information, a visual state presented by the virtual object. For example, when the obtained audio data is the rock music type, the dynamic effect may be a relatively dynamic effect.

In an embodiment, the terminal recognizes a text feature of a keyword in the audio data, and selects a corresponding dynamic effect according to the recognized text feature. For example, when a keyword in the audio data is recognized as a stressed syllable, the dynamic effect of the virtual object is switched to a dynamic effect corresponding to the stressed syllable.

In the foregoing embodiment, the corresponding dynamic effect is determined by using the recognition result of the audio data, so that the virtual object presents different dynamic effects as the audio data changes, thereby improving interactivity between a user and the virtual object.

In a conventional image processing solution, most cameras or short video applications have a capability of dynamically displaying a virtual object, that is, the virtual object moves as a human face moves, and also have a capability of playing background music or receiving a microphone sound, that is, a video may be recorded with the background music or the microphone sound. However, at present, there has not been an application that may obtain a sound in real time, and further analyze the attribute of the sound to adjust attribute information of the virtual object in real time.

Figure 13:
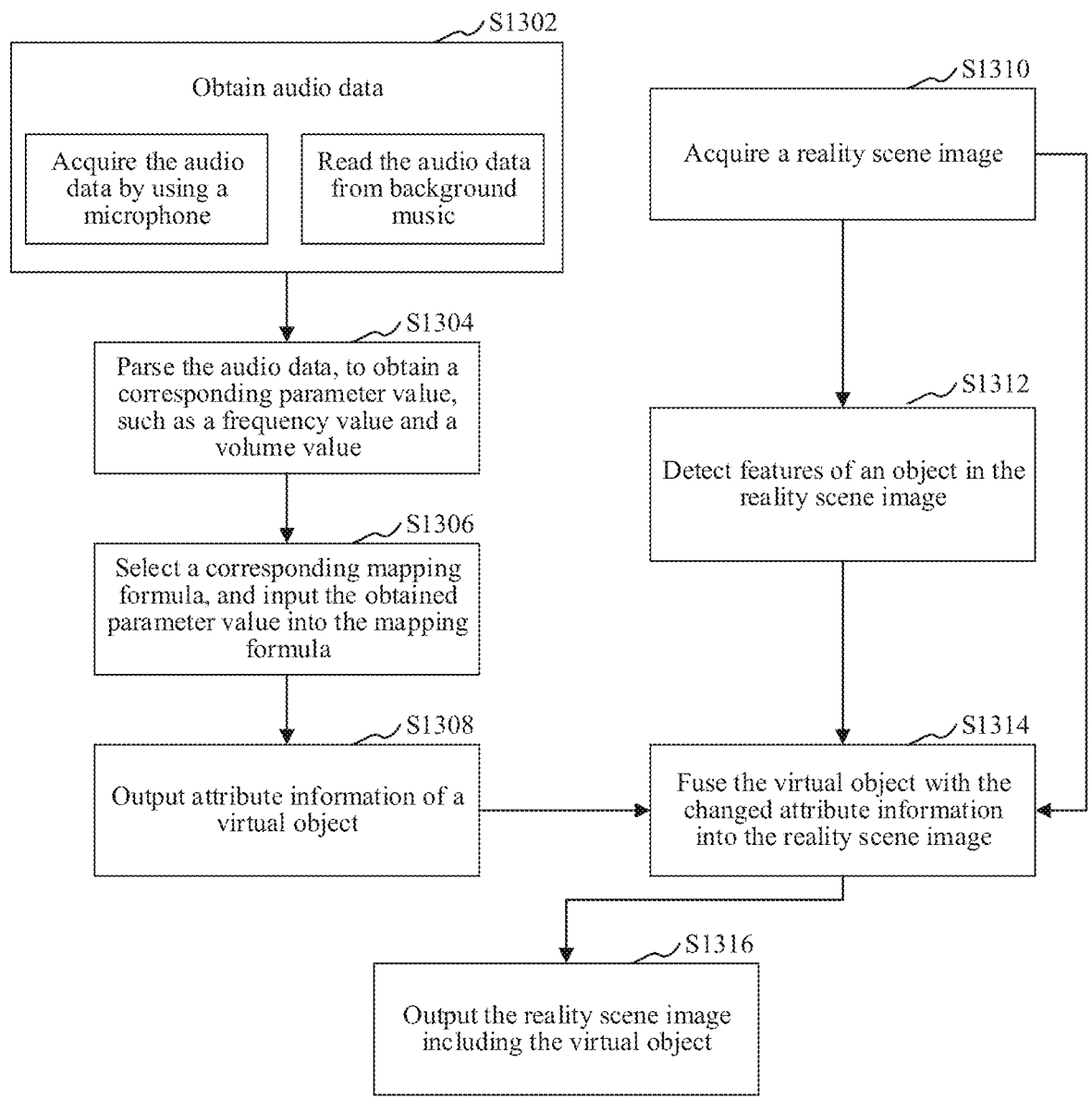
FIG. 13 is a schematic flowchart of an image processing method according to another embodiment.

To resolve the foregoing problem, an embodiment of the present disclosure provides an image processing method. By using the image processing method, a virtual object may be dynamically adjusted according to a change of music (for example, the virtual object changes with the music), so that a color, a size, or a rotation angle of the virtual object changes as a volume value or a frequency value of the music changes. As shown in FIG. 13, the image processing method includes the following steps:

S1302. Obtain audio data.

The manner in which a terminal obtains audio data may be that: 1. the audio data is acquired by using a microphone of the terminal; and 2. the audio data is read from corresponding background music played by the terminal. The manner of acquiring the audio data by using the microphone of the terminal is acquiring audio data from the outside, for example, acquiring speech of a user by using a common microphone function of a mobile phone. The manner of reading the audio data from the corresponding background music played by the terminal is that the terminal decodes an audio format file of the played background music, to obtain the audio data. One type of the audio data obtained in the foregoing two manners may be used as an input source, or a mix of the audio data obtained in the foregoing two manners may be used as an input source. The terminal encodes the obtained audio data into binary encoded audio data in a PCM manner. The audio data may be also referred to as an audio signal, which is not distinguished in this embodiment.

PCM is a common encoding manner. Sampling is performed on analogue audio data according to a preset time interval, to discretize the analogue audio data. Then, a sampling value is quantized, and the quantized sampling value is encoded, to obtain an amplitude value of a sampled pulse represented by using binary code.

S1304. Parse the audio data, to obtain a corresponding parameter value, such as a frequency value and a volume value.

The terminal obtains the encoded audio data obtained after PCM encoding, and parses attribute information related to a sound from the encoded audio data. The attribute information may include a volume value, a frequency value, and a timbre.

The volume value may be represented by the loudness of the audio data or an amplitude value of a waveform corresponding to the audio data, indicates a volume magnitude of the audio data within a time period, and is calculated by using the following formula:

$$\bar{v} = 20 \log_{10}\left(\frac{1}{N}\sum_{i=1}^{N} \text{abs}(v_i)\right)$$

where $v_i$ represents an amplitude of a sampling point in the encoded audio data obtained after PCM encoding, and N represents a quantity of sampling points. In this embodiment, N may be 1024, or may be another value. For audio data with a sampling rate of 48k, calculation of the volume value may be performed for 48 times within one second.

The frequency value may be a vertical vibration count of a waveform corresponding to the audio data per unit of time, and a unit of the frequency value is Hz. The audio data may be superposed by sine waves with different frequency values and different amplitude values. The encoded audio data obtained after the PCM encoding may be converted into frequency domain audio data by using a fast Fourier transformation (FFT) algorithm, and the frequency value and the volume value (that is, the amplitude value) may be obtained by using the frequency domain audio data.

When the encoded audio data obtained after the PCM encoding is converted into the frequency domain audio data, 512-point FFT may be used. Frequency bands from 0 to a cut-off frequency (if a sampling rate is 48 kHz, the cut-off frequency is 24 kHz) may be equally segmented into 256 frequency bands at most, and amplitude values of the frequency bands are calculated, thereby obtaining the volume value of the audio data. In addition, a frequency band with a maximum amplitude is obtained, and the frequency value corresponding to the audio data is determined according to sub-frequency domain audio data in the frequency band with the maximum amplitude.

Both the calculation of the volume value and the FFT calculation may be performed by the terminal in real time.

S1306. Select a corresponding mapping formula, and input the obtained parameter value into the mapping formula.

The terminal obtains frequency domain audio data within each time period. Using an example in which audio data with a sampling rate of 48 kHz is used as an input source, calculation is performed for 48 times within one second. The terminal designs different mapping formulas according to different requirements. The mapping formula is the mapping relationship in the embodiments of the present disclosure. An input variable of the mapping formula is the volume value or the frequency value, an output is the attribute information of the virtual object, and the attribute information is a color, a zooming ratio, a rotation angle, or the like. Using an example in which the volume value of the audio data is an input, and a zooming ratio of the virtual object is the output, the following piecewise mapping formula may be designed:

$$f(x) = \begin{cases} 1.0, & x < 50 \\ 1.0 + 3.0 \times \dfrac{x - 50}{70}, & x \geq 50 \end{cases}$$

where x is a volume value of the audio data, and may range from 0 to 120 db, and $f(x)$ is a zooming ratio of the virtual object.

Various mapping formulas may be configured according to actual requirements. The mapping formula is configurable in 3 dimensions: (1) the mapping formula is configured according to an input type of the mapping formula, where the input type is, for example, a volume value or a frequency value; (2) the mapping formula is configured according to an output type of the mapping formula, where the output type may be attribute information of a virtual object, such as a zooming ratio, a color, a rotation angle, and an offset, in different dimensions; and (3) the mapping formula is configured according to a correspondence between an input and an output of a function.

S1308. Output attribute information of a virtual object.

When a decibel value is less than 50 db, the virtual object remains the default size of 1.0 according to the foregoing mapping formula. When the decibel value is greater than 50 db, the zooming ratio of the virtual object increases as the decibel value increases. When the decibel value is 120 db, the zooming ratio is 4.0.

As shown in FIG. 5, FIG. 5 (a) shows that the default size, that is, the zooming ratio, is 1.0, and FIG. 5(b) shows an effect when the zooming ratio is about 2.0.

S1310. Acquire a reality scene image.

The terminal may acquire a reality scene image in real time by using a camera. The reality scene image may be one frame of image in a video acquired by the camera in real time.

S1312. Detect features of an object in the reality scene image.

The terminal performs feature detection, such as facial feature detection, on a target object in the reality scene image.

The detection manner may be performing feature detection by using a facial alignment point SDK of open source opencv or dlib, or by using a facial feature point detection SDK provided by YouTu, Sense Time, or the like.

S1314. Fuse the virtual object with the changed attribute information into the reality scene image.

The terminal fuses the virtual object with the adjusted attribute information into a fixed area (using a facial feature point of the target object as an anchor point) of the target object in the reality scene image, so that the virtual object may change in real time as a human face and attribute information of the audio data change.

Using an example in which the volume value of the audio data controls the zooming ratio of the virtual object, the virtual object may change with a human face, and the size of the virtual object changes in real time as a volume value acquired by a microphone, or a volume value of background music changes.

S1316. Output the reality scene image including the virtual object.

By using the foregoing embodiment, playability of a selfie or short video APP may be greatly improved. The size, the color, the rotation angle, or the like of the virtual object changes as the parameter value of the audio data changes, which increases diversified changes of the virtual object, and improves interactivity between a user and the virtual object.

FIG. 2 is a schematic flowchart of an image processing method according to an embodiment. It is to be understood that, steps in the flowchart in FIG. 2 are displayed sequentially based on indication of arrows, but the steps are not necessarily performed sequentially based on the sequence indicated by the arrows. Unless explicitly specified in the present disclosure, the sequence for performing the steps is not strictly limited, and the steps may be performed in other sequences. In addition, at least some steps in FIG. 2 may include a plurality of sub-steps or a plurality of stages. The substeps or the stages are not necessarily performed at the same moment, but may be performed at different moments. The substeps or the stages are not necessarily performed in sequence, but may be performed in turn or alternately with other steps or at least some of substeps or stages of other steps.

Figure 14:
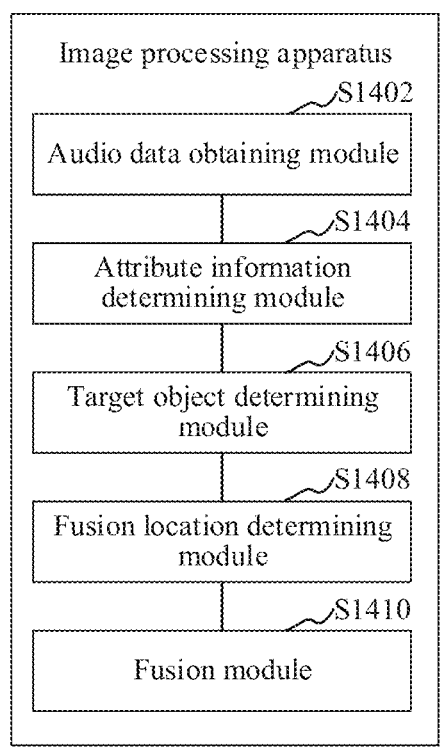
FIG. 14 is a structural block diagram of an image processing apparatus according to an embodiment.

As shown in FIG. 14, in an embodiment, an image processing apparatus is provided. The image processing apparatus specifically includes: an audio data obtaining module 1402, an attribute information determining module 1404, a target object determining module 1406, a fusion location determining module 1408, and a fusion module 1410.

The audio data obtaining module 1402 is configured to obtain audio data corresponding to a reality scene image acquired in real time.

The attribute information determining module 1404 is configured to dynamically determine attribute information of a virtual object according to the audio data, the attribute information being used for determining a visual state of the virtual object.

The target object determining module 1406 is configured to determine a target object from the reality scene image.

The fusion location determining module 1408 is configured to determine a fusion location of the virtual object determined according to the attribute information in the reality scene image according to the target object.

The fusion module 1410 is configured to fuse the virtual object determined according to the attribute information into the reality scene image according to the fusion location, the virtual object presenting different visual states in a case that the attribute information is different.

In an embodiment, the audio data obtaining module 1402 is further configured to acquire the audio data corresponding to the reality scene image from a current environment in real time in a case of acquiring the reality scene image in real time; or read audio data corresponding to a timestamp corresponding to the reality scene image from a background audio of the reality scene image acquired in real time.

In an embodiment, the target object determining module 1406 is further configured to recognize a biological feature from the reality scene image; and in a case that the biological feature meets a preset condition, determine a biological object corresponding to the biological feature, in the reality scene image as the target object.

In the foregoing embodiment, audio data corresponding to a reality scene image acquired in real time is obtained, and an attribute of a virtual object is dynamically determined by using the audio data, thereby implementing control on the attribute of the virtual object according to the audio data. A fusion location of the virtual object in the reality scene image is determined by using a target object in the reality scene image, and the virtual object determined according to attribute information is fused into the reality scene image according to the fusion location. Because the attribute information of the virtual object is controlled by the audio data, when the audio data changes, the attribute information of the virtual object fused into the reality scene image also changes accordingly, which improves interactivity.

In an embodiment, the attribute information determining module 1404 is further configured to obtain a parameter value of the audio data; determine a preset mapping relationship between the parameter value and the attribute information of the virtual object; and map the parameter value to the attribute information of the virtual object according to the preset mapping relationship.

In an embodiment, the attribute information determining module 1404 performs sampling on the audio data; performs quantization and encoding on a result obtained through the sampling, to obtain encoded audio data; and determines the parameter value of the audio data according to the obtained encoded audio data.

In the foregoing embodiment, a preset mapping relationship between the parameter value and the attribute information of the virtual object is determined. When a corresponding parameter value is obtained, corresponding attribute information of the virtual object may be obtained by using the preset mapping relationship, thereby implementing adjustment on the virtual object, so that the virtual object presents different visual states, and diversified changes of the virtual object are increased.

In an embodiment, the parameter value includes a frequency value; and the attribute information determining module 1404 is further configured to convert the encoded audio data in time domain into frequency domain audio data; segment the frequency domain audio data, to obtain a plurality of sub-frequency domain audio data; determine amplitudes of the plurality of sub-frequency domain audio data; select sub-frequency domain audio data with a maximum amplitude from the plurality of sub-frequency domain audio data; and determine, according to the selected sub-frequency domain audio data, a frequency value corresponding to the audio data.

In the foregoing embodiment, the frequency domain audio data is segmented, and the frequency value may be determined by using the sub-frequency domain audio data obtained after the division. On one hand, the virtual object may be adjusted by using the frequency value; on the other hand, for the segmented frequency domain audio data, a calculation amount may be reduced during a calculation process, thereby improving a calculation rate.

In an embodiment, the parameter value includes a volume value; and the attribute information determining module 1404 is further configured to determine a volume value according to the obtained encoded audio data; or convert the encoded audio data in time domain into frequency domain audio data; and determine a volume value according to the frequency domain audio data.

In the foregoing embodiment, the volume value is determined in two manners, that is, according to the obtained encoded audio data, or according to the frequency domain audio data converted by the encoded audio data in time domain, to obtain the attribute information used for determining the visual state of the virtual object, and the virtual object may be adjusted by using the volume value.

In an embodiment, the attribute information includes an attribute adjustment amount; and the virtual object determined according to the attribute information is a virtual object having a corresponding attribute that has been adjusted according to the attribute adjustment amount. The fusion module 1410 is further configured to determine an attribute, of the virtual object, corresponding to the attribute adjustment amount; adjust the attribute of the virtual object according to the attribute adjustment amount, to obtain an attribute-adjusted virtual object; and fuse the attribute-adjusted virtual object into the reality scene image according to the fusion location.

In the foregoing embodiment, the attribute of the virtual object is adjusted by using the attribute adjustment amount, and the attribute-adjusted virtual object is fused into the reality scene image according to the fusion location, to obtain a virtual object which changes as a parameter of the audio data changes, thereby implementing adjustment on the virtual object according to the audio data, so that diversified changes of the virtual object are increased, and user experience is improved.

In an embodiment, the attribute information includes a target attribute change value; and the virtual object determined according to the attribute information is a virtual object having a corresponding attribute that has been changed to the target attribute change value. The fusion module 1410 is further configured to determine an attribute, of the virtual object, corresponding to the target attribute change value; change the attribute of the virtual object to the target attribute change value, to obtain an attribute-changed virtual object; and fuse the attribute-changed virtual object into the reality scene image according to the fusion location.

In the foregoing embodiment, the attribute of the virtual object is adjusted by using the target attribute change value, and the attribute-adjusted virtual object is fused into the reality scene image according to the fusion location, to obtain a virtual object which changes as a parameter of the audio data changes, thereby implementing adjustment on the virtual object according to the audio data, so that diversified changes of the virtual object are increased, and user experience is improved.

In an embodiment, the fusion location determining module 1408 is further configured to detect features of the target object; search the detected features for a feature matching the virtual object determined according to the attribute information; and determine the fusion location of the virtual object determined according to the attribute information in the reality scene image according to the matched feature.

In the foregoing embodiment, the fusion location of the virtual object in the reality scene image is determined by using the feature points of the target object, so that the virtual object is fused into the reality scene image according to the fusion location, and a virtual object with the changed visual state is obtained, thereby increasing diversified changes of the virtual object.

Figure 15:
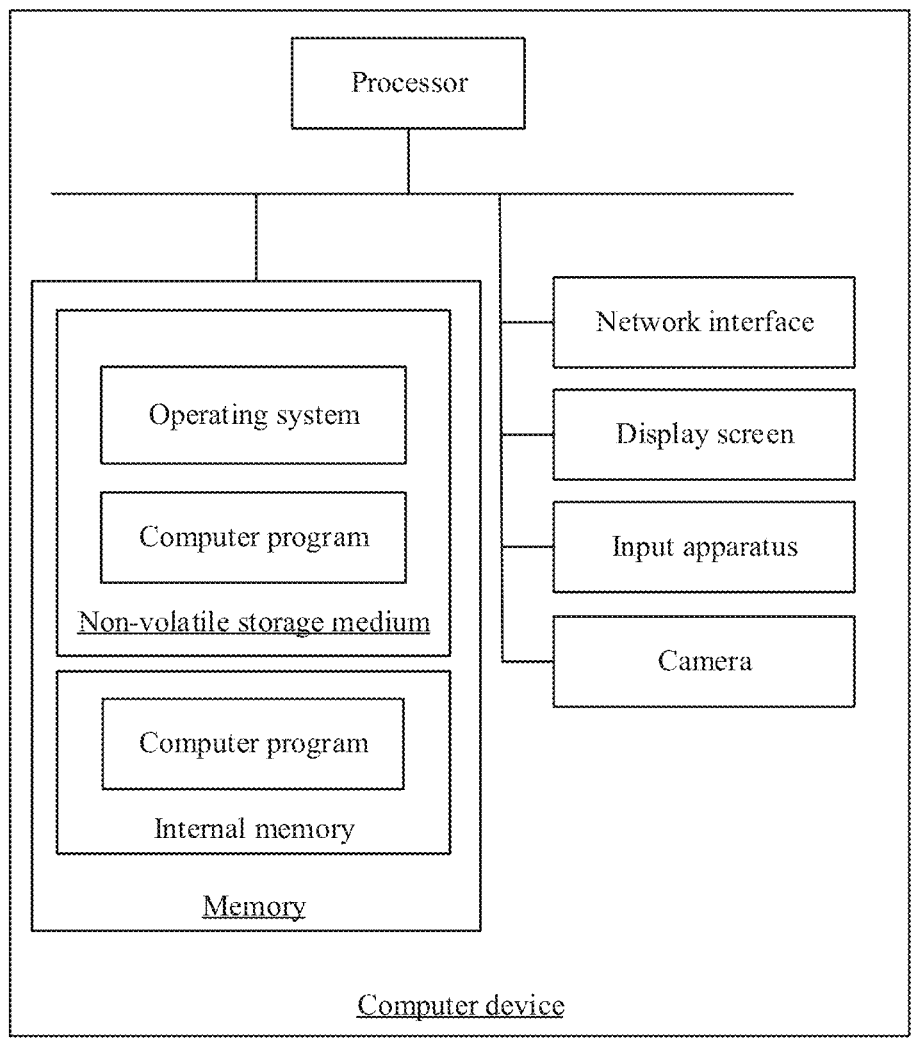
FIG. 15 is a structural block diagram of a computer device according to an embodiment.

FIG. 15 is a diagram of an internal structure of a computer device according to an embodiment. The computer device may be specifically the terminal in FIG. 1. As shown in FIG. 15, the computer device includes a processor, a memory, a network interface, an input apparatus and a display screen that are connected by using a system bus. The memory includes a non-volatile storage medium and an internal memory. The non-volatile storage medium of the computer device stores an operating system and may further store a computer program, the computer program, when executed by the processor, causing the processor to implement the image processing method. The internal memory may also store a computer program, the computer program, when executed by the processor, causing the processor to perform the image processing method. The display screen of the computer device may be a liquid crystal display screen or an e-ink display screen. The input apparatus of the computer device may be a touch layer covering the display screen, or may be a button, a trackball, or a touchpad disposed on a housing of the computer device, or may be an external keyboard, touchpad, a mouse, or the like.

A person skilled in the art may understand that, the structure shown in FIG. 15 is merely a block diagram of a partial structure related to a solution in the present disclosure, and does not constitute a limitation to the computer device to which the solution in the present disclosure is applied. Specifically, the computer device may include more or fewer components than those shown in the figure, or some components may be combined, or a different component deployment may be used.

In an embodiment, the image processing apparatus provided in the present disclosure may be implemented in a form of a computer program, and the computer program may be run on the computer device shown in FIG. 15. The memory of the computer device may store program modules forming the image processing apparatus, for example, the audio data obtaining module 1402, the attribute information determining module 1404, the target object determining module 1406, the fusion location determining module 1408, and the fusion module 1410 shown in FIG. 14. The computer program formed by the program modules causes the processor to perform the steps in the image processing method in the embodiments of the present disclosure described in this specification.

For example, the computer device shown in FIG. 15 may perform S202 by using the audio data obtaining module 1402 in the image processing apparatus shown in FIG. 14. The computer device may perform S204 by using the attribute information determining module 1404. The computer device may perform S206 by using the target object determining module 1406. The computer device may perform S208 by using the fusion location determining module 1408. The computer device may perform S210 by using the fusion module 1410.

In an embodiment, a computer device is provided, including a memory and a processor, the memory storing a computer program, the computer program, when executed by the processor, causing the processor to perform the following operations: obtaining audio data corresponding to a reality scene image acquired in real time; dynamically determining attribute information of a virtual object according to the audio data, the attribute information being used for determining a visual state of the virtual object; determining a target object from the reality scene image; determining a fusion location of the virtual object determined according to the attribute information in the reality scene image according to the target object; and fusing the virtual object determined according to the attribute information into the reality scene image according to the fusion location, the virtual object presenting different visual states in a case that the attribute information is different.

In an embodiment, when executed by the processor to perform the operation of obtaining audio data corresponding to a reality scene image acquired in real time, the computer program causes the processor to specifically perform the following operation: acquiring the audio data corresponding to the reality scene image from a current environment in real time in a case of acquiring the reality scene image in real time; or reading audio data corresponding to a timestamp corresponding to the reality scene image from a background audio of the reality scene image acquired in real time.

In an embodiment, when executed by the processor to perform the operation of dynamically determining attribute information of a virtual object according to the audio data, the computer program causes the processor to specifically perform the following operations: obtaining a parameter value of the audio data; determining a preset mapping relationship between the parameter value and the attribute information of the virtual object; and mapping the parameter value to the attribute information of the virtual object according to the preset mapping relationship.

In an embodiment, when executed by the processor to perform the operation of obtaining a parameter value of the audio data, the computer program causes the processor to specifically perform the following operations: performing sampling on the audio data; performing quantization and encoding on a result obtained through the sampling, to obtain encoded audio data; and determining the parameter value of the audio data according to the obtained encoded audio data.

In an embodiment, the parameter value includes a frequency value, and when executed by the processor to perform the operation of determining the parameter value of the audio data according to the obtained encoded audio data, the computer program causes the processor to specifically perform the following operations: converting the encoded audio data in time domain into frequency domain audio data; segmenting the frequency domain audio data, to obtain a plurality of sub-frequency domain audio data; determining amplitudes of the plurality of sub-frequency domain audio data; selecting sub-frequency domain audio data with a maximum amplitude from the plurality of sub-frequency domain audio data; and determining, according to the selected sub-frequency domain audio data, a frequency value corresponding to the audio data.

In an embodiment, the parameter value includes a volume value, and when executed by the processor to perform the operation of determining the parameter value of the audio data according to the obtained encoded audio data, the computer program causes the processor to specifically perform the following operations: determining a volume value according to the obtained encoded audio data; or converting the encoded audio data in time domain into frequency domain audio data; and determining a volume value according to the frequency domain audio data.

In an embodiment, the attribute information includes an attribute adjustment amount; and the virtual object determined according to the attribute information is a virtual object having a corresponding attribute that has been adjusted according to the attribute adjustment amount. When executed by the processor to perform the operation of fusing the virtual object determined according to the attribute information into the reality scene image according to the fusion location, the computer program causes the processor to specifically perform the following operations: determining an attribute, of the virtual object, corresponding to the attribute adjustment amount; adjusting the attribute of the virtual object according to the attribute adjustment amount, to obtain an attribute-adjusted virtual object; and fusing, according to the fusion location, the attribute-adjusted virtual object into the reality scene image.

In an embodiment, the attribute information includes a target attribute change value; and the virtual object determined according to the attribute information is a virtual object having a corresponding attribute that has been changed to the target attribute change value. When executed by the processor to perform the operation of fusing the virtual object determined according to the attribute information into the reality scene image according to the fusion location, the computer program causes the processor to specifically perform the following operations: determining an attribute, of the virtual object, corresponding to the target attribute change value; changing the attribute of the virtual object to the target attribute change value, to obtain an attribute-changed virtual object; and fusing the attribute-changed virtual object into the reality scene image according to the fusion location.

In an embodiment, when executed by the processor to perform the operation of determining a target object from the reality scene image, the computer program causes the processor to specifically perform the following operations: recognizing a biological feature from the reality scene image; and in a case that the biological feature meets a preset condition, determining a biological object corresponding to the biological feature, in the reality scene image as the target object.

In an embodiment, when executed by the processor to perform the operation of determining a fusion location of the virtual object determined according to the attribute information in the reality scene image according to the target object, the computer program causes the processor to specifically perform the following operations: detecting features of the target object; searching the detected features for a feature matching the virtual object determined according to the attribute information; and determining the fusion location of the virtual object determined according to the attribute information in the reality scene image according to the matched feature.

In an embodiment, a computer-readable storage medium is provided, storing a computer program, the computer program, when executed by a processor, causing the processor to perform the following operations: obtaining audio data corresponding to a reality scene image acquired in real time; dynamically determining attribute information of a virtual object according to the audio data, the attribute information being used for determining a visual state of the virtual object; determining a target object from the reality scene image; determining a fusion location of the virtual object determined according to the attribute information in the reality scene image according to the target object; and fusing the virtual object determined according to the attribute information into the reality scene image according to the fusion location, the virtual object presenting different visual states in a case that the attribute information is different.

In an embodiment, when executed by the processor to perform the operation of obtaining audio data corresponding to a reality scene image acquired in real time, the computer program causes the processor to specifically perform the following operation: acquiring the audio data corresponding to the reality scene image from a current environment in real time in a case of acquiring the reality scene image in real time; or reading audio data corresponding to a timestamp corresponding to the reality scene image from a background audio of the reality scene image acquired in real time.

In an embodiment, when executed by the processor to perform the operation of dynamically determining attribute information of a virtual object according to the audio data, the computer program causes the processor to specifically perform the following operations: obtaining a parameter value of the audio data; determining a preset mapping relationship between the parameter value and the attribute information of the virtual object; and mapping the parameter value to the attribute information of the virtual object according to the preset mapping relationship.

In an embodiment, when executed by the processor to perform the operation of obtaining a parameter value of the audio data, the computer program causes the processor to specifically perform the following operations: performing sampling on the audio data; performing quantization and encoding on a result obtained through the sampling, to obtain encoded audio data; and determining the parameter value of the audio data according to the obtained encoded audio data.

In an embodiment, the parameter value includes a frequency value, and when executed by the processor to perform the operation of determining the parameter value of the audio data according to the obtained encoded audio data, the computer program causes the processor to specifically perform the following operations: converting the encoded audio data in time domain into frequency domain audio data; segmenting the frequency domain audio data, to obtain a plurality of sub-frequency domain audio data; determining amplitudes of the plurality of sub-frequency domain audio data; selecting sub-frequency domain audio data with a maximum amplitude from the plurality of sub-frequency domain audio data; and determining, according to the selected sub-frequency domain audio data, a frequency value corresponding to the audio data.

In an embodiment, the parameter value includes a volume value, and when executed by the processor to perform the operation of determining the parameter value of the audio data according to the obtained encoded audio data, the computer program causes the processor to specifically perform the following operations: determining a volume value according to the obtained encoded audio data; or converting the encoded audio data in time domain into frequency domain audio data; and determining a volume value according to the frequency domain audio data.

In an embodiment, the attribute information includes an attribute adjustment amount; and the virtual object determined according to the attribute information is a virtual object having a corresponding attribute that has been adjusted according to the attribute adjustment amount. When executed by the processor to perform the operation of fusing the virtual object determined according to the attribute information into the reality scene image according to the fusion location, the computer program causes the processor to specifically perform the following operations: determining an attribute, of the virtual object, corresponding to the attribute adjustment amount; adjusting the attribute of the virtual object according to the attribute adjustment amount, to obtain an attribute-adjusted virtual object; and fusing, according to the fusion location, the attribute-adjusted virtual object into the reality scene image.

In an embodiment, the attribute information includes a target attribute change value; and the virtual object determined according to the attribute information is a virtual object having a corresponding attribute that has been changed to the target attribute change value. When executed by the processor to perform the operation of fusing the virtual object determined according to the attribute information into the reality scene image according to the fusion location, the computer program causes the processor to specifically perform the following operations: determining an attribute, of the virtual object, corresponding to the target attribute change value; changing the attribute of the virtual object to the target attribute change value, to obtain an attribute-changed virtual object; and fusing the attribute-changed virtual object into the reality scene image according to the fusion location.

In an embodiment, when executed by the processor to perform the operation of determining a target object from the reality scene image, the computer program causes the processor to specifically perform the following operations: recognizing a biological feature from the reality scene image; and in a case that the biological feature meets a preset condition, determining a biological object corresponding to the biological feature, in the reality scene image as the target object.

In an embodiment, when executed by the processor to perform the operation of determining a fusion location of the virtual object determined according to the attribute information in the reality scene image according to the target object, the computer program causes the processor to specifically perform the following operations: detecting features of the target object; searching the detected features for a feature matching the virtual object determined according to the attribute information; and determining the fusion location of the virtual object determined according to the attribute information in the reality scene image according to the matched feature.

In an embodiment, when executed by the processor, the computer program causes the processor to specifically perform the following operations: extracting an audio feature of the audio data; and in a case that the audio feature accords with a first trigger condition, performing at least one of the following operations: newly adding a virtual object; switching the virtual object; and switching a type of the visual state.

In an embodiment, when executed by the processor, the computer program causes the processor to specifically perform the following operations: performing recognition according to the audio data, to obtain a recognition result; determining a dynamic effect type matching the recognition result; and determining, according to the dynamic effect type and the attribute information, a visual state presented by the virtual object, the visual state matching the dynamic effect type.

A person of ordinary skill in the art may understand that all or some of the processes of the methods in the foregoing embodiments may be implemented by a computer program instructing relevant hardware. The program may be stored in a non-volatile computer-readable storage medium. When the program is executed, the processes of the foregoing method embodiments may be performed. Any reference to a memory, a storage, a database, or another medium used in the various embodiments provided in the present disclosure can include a non-volatile and/or volatile memory. The non-volatile memory may include a read-only memory (ROM), a programmable ROM (PROM), an electrically programmable ROM (EPROM), an electrically erasable programmable ROM (EEPROM) or a flash memory. The volatile memory may include a random access memory (RAM) or an external cache. As an illustration instead of a limitation, the RAM is available in a plurality of forms, such as a static RAM (SRAM), a dynamic RAM (DRAM), a synchronous DRAM (SDRAM), a double data rate SDRAM (DDRSDRAM), an enhanced SDRAM (ESDRAM), a synchronous link (Synchlink) DRAM (SLDRAM), a Rambus (Rambus) direct RAM (RDRAM), a direct Rambus dynamic RAM (DRDRAM), and a Rambus dynamic RAM (RDRAM).

The technical features in the foregoing embodiments may be randomly combined. For concise description, not all possible combinations of the technical features in the embodiment are described. However, the combinations of the technical features shall all be considered as falling within the scope recorded in this specification provided that they do not conflict with each other.

The foregoing embodiments only describe several implementations of the present disclosure, which are described in detail, but are not to be construed as a limitation to the patent scope of the present disclosure. A person of ordinary skill in the art may further make variations and improvements without departing from the ideas of the present disclosure, which shall fall within the protection scope of the present disclosure. Therefore, the protection scope of the present disclosure shall be subject to the protection scope of the appended claims.

What is claimed is:

1. An image processing method, applied to an image processing device, the method comprising:
   obtaining first audio data corresponding to an $(i-1)^{th}$ frame at an $(i-1)^{th}$ time moment of a reality scene image, and obtaining second audio data corresponding to an $i^{th}$ frame at an $i^{th}$ time moment of the reality scene image;
   determining, according to a preset mapping relationship, first attribute information of a virtual object corresponding to the first audio data and second attribute information of the virtual object corresponding to the second audio data, wherein the preset mapping relationship correlates attribute information of the virtual object with values of the audio data, and wherein the first and the second attribute information each includes information on a zooming ratio or a rotation angle of the virtual object; and
   fusing the virtual object with the first attribute feature onto the $(i-1)^{th}$ frame of the reality scene image and fusing the virtual object with the second attribute feature onto the $i^{th}$ frame of the reality scene image.

2. The method according to claim 1, wherein the first audio data or the second audio data is obtained by:
   acquiring the first or the second audio data corresponding to the reality scene image from a current environment in real time when acquiring the reality scene image in real time; or
   reading the first or the second audio data corresponding to a timestamp corresponding to the reality scene image from a background audio of the reality scene image played by the image processing device and acquired in real time.

3. The method according to claim 1, further comprising:
   performing quantization and encoding on first or the second audio data.

4. The method according to claim 1, further comprising:
   determining a frequency value of the first or the second audio data.

5. The method according to claim 1, further comprising:
   determining a volume value of the first or the second audio data.

6. The method according to claim 1, further comprising:
   adjusting the second attribute information of the virtual object to obtain an attribute-adjusted virtual object; and fusing the attribute-adjusted virtual object into the reality scene image.

7. The method according to claim 1, further comprising:
recognizing a biological feature from the reality scene image; and
upon determining the biological feature meeting a preset condition, determining a biological object corresponding to the biological feature, in the reality scene image as a target object.

8. The method according to claim 1, further comprising:
extracting an audio feature of the audio data; and
upon determining that the audio feature accords with a first trigger condition, performing at least one of the following operations: newly adding a virtual object; switching the virtual object; and switching a type of the visual state.

9. The method according to claim 1, further comprising:
forming a video by combining the $i^{th}$ frame of the reality scene image added with the first attribute feature of the virtual object and the $(i-1)^{th}$ frame of the reality scene image added with the second attribute feature of the virtual object.

10. The method according to claim 1, wherein the preset mapping relationship changes in the audio data with changes in the zooming ratio of the virtual object.

11. The method according to claim 1, wherein the preset mapping relationship changes in the audio data with changes in the rotation angle of the virtual object.

12. The method according to claim 1, wherein the virtual object is positioned at an eye location, a head location, a lip location, a tooth location, a face location, or a nose location of a target object in the reality scene image.

13. The method according to claim 12, wherein the virtual objection with the second attribute information is of a larger size than the virtual objection with the first attribute information.

14. A computer device, comprising a memory and a processor coupled to the memory and configured to perform the following operations:
obtaining first audio data corresponding to an $(i-1)^{th}$ frame at an $(i-1)^{th}$ time moment of a reality scene image, and obtaining second audio data corresponding to an $i^{th}$ frame at an $i^{th}$ time moment of the reality scene image;
determining, according to a preset mapping relationship, first attribute information of a virtual object corresponding to the first audio data and second attribute information of the virtual object corresponding to the second audio data, wherein the preset mapping relationship correlates attribute information of the virtual object with values of the audio data, and wherein the first and the second attribute information each includes information on a zooming ratio or a rotation angle of the virtual object; and
fusing the virtual object with the first attribute feature onto the $(i-1)^{th}$ frame of the reality scene image and fusing the virtual object with the second attribute feature onto the $i^{th}$ frame of the reality scene image.

15. The computer device according to claim 14, wherein the first audio data or the second audio data is obtained by:
acquiring the first or the second audio data corresponding to the reality scene image from a current environment in real time when acquiring the reality scene image in real time; or
reading the first or the second audio data corresponding to a timestamp corresponding to the reality scene image from a background audio of the reality scene image played by the image processing device and acquired in real time.

16. The computer device according to claim 14, wherein the computer program causes the processor to further perform:
performing quantization and encoding first or the second audio data.

17. The computer device according to claim 14, wherein the computer program causes the processor to further perform:
determining a frequency value of the first or the second audio data.

18. The computer device according to claim 14, wherein the computer program causes the processor to further perform:
determining a volume value of the first or the second audio data.

19. The computer device according to claim 14, wherein the computer program causes the processor to further perform:
adjusting the second attribute information of the virtual object to obtain an attribute-adjusted virtual object; and
fusing the attribute-adjusted virtual object into the reality scene image.

20. A non-transitory storage medium, storing a computer program, the computer program, when executed by a processor, causing the processor to perform:
obtaining first audio data corresponding to an $(i-1)^{th}$ frame at an $(i-1)^{th}$ time moment of a reality scene image, and obtaining second audio data corresponding to an $i^{th}$ frame at an $i^{th}$ time moment of the reality scene image;
determining, according to a preset mapping relationship, first attribute information of a virtual object corresponding to the first audio data and second attribute information of the virtual object corresponding to the second audio data, wherein the preset mapping relationship correlates attribute information of the virtual object with values of the audio data, and wherein the first and the second attribute information each includes information on a zooming ratio or a rotation angle of the virtual object; and
fusing the virtual object with the first attribute feature onto the $(i-1)^{th}$ frame of the reality scene image and fusing the virtual object with the second attribute feature onto the $i^{th}$ frame of the reality scene image.

* * * * *